US011431611B2

(12) United States Patent
Dong et al.

(10) Patent No.: US 11,431,611 B2
(45) Date of Patent: *Aug. 30, 2022

(54) COMPUTING FORWARDING PATHS BASED ON NOTIFICATION PACKET DELAYS

(71) Applicant: Huawei Technologies Co., Ltd., Shenzhen (CN)

(72) Inventors: Jie Dong, Beijing (CN); Guoyi Chen, Beijing (CN); Zongpeng Du, Shenzhen (CN); Ling Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,538

(22) Filed: Nov. 10, 2020

(65) Prior Publication Data

US 2021/0058315 A1 Feb. 25, 2021

Related U.S. Application Data

(63) Continuation of application No. 16/232,854, filed on Dec. 26, 2018, now Pat. No. 10,855,574, which is a continuation of application No. PCT/CN2017/087553, filed on Jun. 8, 2017.

(30) Foreign Application Priority Data

Jun. 29, 2016 (CN) .......................... 201610493644.8

(51) Int. Cl.
*H04L 1/00* (2006.01)
*H04L 45/121* (2022.01)
(Continued)

(52) U.S. Cl.
CPC ............ *H04L 45/121* (2013.01); *H04L 45/02* (2013.01); *H04L 45/123* (2013.01); *H04L 45/127* (2013.01); *H04L 45/24* (2013.01)

(58) Field of Classification Search
CPC ..... H04L 45/121; H04L 45/02; H04L 45/123; H04L 45/24
See application file for complete search history.

(56) References Cited

U.S. PATENT DOCUMENTS 6,687,229 B1 2/2004 Kataria et al.
2003/0053466 A1 3/2003 Bizet et al.
(Continued)

FOREIGN PATENT DOCUMENTS

CN 1941737 4/2007
CN 101119303 2/2008
(Continued)

OTHER PUBLICATIONS

Ning, S., et al., "Advanced Multipath Framework in MPLS," draft-ietf-rtgwg-cl-framework-04.txt, Jul. 15, 2013, 44 pages.
(Continued)

*Primary Examiner* — Abdelnabi O Musa
(74) *Attorney, Agent, or Firm* — Conley Rose, P.C.

(57) ABSTRACT

A method includes receiving, by a network device, notification packets separately sent by a plurality of forwarding nodes, where each notification packet includes interface forwarding delay information of the forwarding node that sends the notification packet, device forwarding delay information of the forwarding node, and a transmission delay of a link connected to the forwarding node; obtaining the interface forwarding delay information and the device forwarding delay information of each of the plurality of forwarding nodes, and obtaining a transmission delay of a link between the plurality of forwarding nodes; and computing a forwarding path between a first forwarding node and a second forwarding node, where a forwarding delay of the forwarding path meets a delay requirement of a service.

20 Claims, 5 Drawing Sheets

(51) Int. Cl.
    *H04L 45/02*    (2022.01)
    *H04L 45/12*    (2022.01)
    *H04L 45/24*    (2022.01)

(56) References Cited

U.S. PATENT DOCUMENTS

| | | | |
|---|---|---|---|
| 2012/0092986 A1* | 4/2012 | Chen | H04L 45/28 370/228 |
| 2015/0249593 A1* | 9/2015 | Alvarez | H04L 41/0803 370/241 |
| 2016/0119223 A1* | 4/2016 | Ramachandran | H04L 45/50 370/219 |
| 2016/0308793 A1* | 10/2016 | Levy-Abegnoli | H04L 45/16 |
| 2017/0093732 A1* | 3/2017 | Akhavain Mohammadi | H04L 45/72 |

FOREIGN PATENT DOCUMENTS

| | | |
|---|---|---|
| CN | 103155499 A | 6/2013 |
| CN | 104734957 | 6/2015 |
| CN | 105471764 | 4/2016 |

OTHER PUBLICATIONS

Previdi, et al., "IS-IS Traffic Engineering (TE) Metric Extensions," RFC 7810, May 2016, 18 pages.
Giacalone, S., et al., "OSPF Traffic Engineering (TE) Metric Extensions," RCE 7471, Mar. 2015, 19 pages.
"Flex Ethernet Implementation Agreement, IA # OIF-FLEXE-01.0," Optical Internetworking Forum (OIF), Mar. 2016, 31 pages.
Atlas, A., et al, "Performance-based Path Section for Explicity Routed LSPs using TE Metric Extensions," TEAS Working Group, XP015105694, Mar. 26, 2015, 10 pages.
Al-Karaki, J.N., et al., "Supporting Quality of Service in Mobile Ad hoc Networks," Computer Systems and Applications, XP010777739, Jan. 3, 2005, 8 pages.
Milner, S., et al., "Survivability and Quality of Service in Mobile Wireless Networking," Military Communications Conference, IEEE, 10.1109/MILCOM 2002, Proceedings, vol. 1, Anaheim, CA, XP010632108, Oct. 7-10, 2002, 6 pages.
Giacalone, S., et al, "OSPF Traffic Engineering (TE) Metric Extensions," draft-ietf-ospf-te-metric-extensions-11.txt, Jan. 9, 2015, 20 pages.
Wei Yong, et al, "Research on Testing of Power PTN Time Delay Characteristics," vol. 13, No. 3, 2015, 5 pages.

\* cited by examiner

COMPUTING FORWARDING PATHS BASED ON NOTIFICATION PACKET DELAYS

CROSS-REFERENCE TO RELATED APPLICATIONS

This application is a continuation of U.S. patent application Ser. No. 16/232,854 filed on Dec. 26, 2018, which is a continuation of International Patent Application No. PCT/CN2017/087553 filed on Jun. 8, 2017, which claims priority to Chinese Patent Application No. 201610493644.8, filed on Jun. 29, 2016. All of the aforementioned patent applications are hereby incorporated by reference in their entireties.

TECHNICAL FIELD

The present disclosure relates to the field of communications technologies, and in particular, to a method and a network device for computing a forwarding path.

BACKGROUND

With continuous development of Internet Protocol (IP)/multi-protocol label switching (MPLS) technologies, many new services emerge in a network, such as a fronthaul service and an internet of things (IoT) service in a fifth-generation (5G) mobile network. All these new services require an IP/MPLS network to provide a bearer. In addition, a service such as industrial control is also migrating from a conventional network or a private network to the IP/MPLS network. A common characteristic of these services is that these services are quite sensitive to a delay and a delay variation and the network needs to provide a deterministic low transmission delay for the service under any circumstances. However, in a conventional IP/MPLS network, various services share various resources in the network. Even though a specified priority can be provided for some services, a performance requirement of the foregoing services cannot be met.

SUMMARY

Embodiments of this application provide a method for computing a forwarding path in a network, so as to resolve a technical problem that a low transmission delay path cannot be provided when a service packet is being forwarded.

According to a first aspect, an embodiment of this application provides a method for computing a forwarding path, and the method includes receiving, by a network device, notification packets separately sent by a plurality of forwarding nodes, where each notification packet includes interface forwarding delay information of the forwarding node that sends the notification packet, device forwarding delay information of the forwarding node that sends the notification packet, and a transmission delay of a link connected to the forwarding node that sends the notification packet; obtaining, by the network device, the interface forwarding delay information and the device forwarding delay information of each of the plurality of forwarding nodes based on the notification packet, and obtaining a transmission delay of a link between the plurality of forwarding nodes based on the notification packet; and computing, by the network device, a forwarding path between a first forwarding node and a second forwarding node based on the interface forwarding delay information and the device forwarding delay information of each forwarding node and the transmission delay of the link between the plurality of forwarding nodes, where the first forwarding node and the second forwarding node are nodes in the plurality of forwarding nodes, and a forwarding delay of the forwarding path meets a delay requirement of a service.

The network device receives the interface forwarding delay information and the device forwarding delay information of the forwarding node and the transmission delay of the link between the forwarding nodes that are sent by the forwarding node, and computes, based on the delay information, the forwarding path that meets the delay requirement of the service. In other words, a method for computing a low transmission delay path is provided. A service packet is forwarded by using the path, so that a deterministic low transmission delay can be provided for service packet forwarding, and service packet transmission reliability can be ensured.

In a possible implementation solution, the interface forwarding delay information of the forwarding node includes a forwarding delay range of an interface of the forwarding node; and the device forwarding delay information of the forwarding node includes a forwarding delay range of the forwarding node, the forwarding delay range of the forwarding node is a delay range that can be ensured by internal processing performed after a data packet enters the forwarding node from an inbound interface and before the data packet reaches an outbound interface, and the inbound interface and the outbound interface are interfaces of the forwarding node.

In a possible implementation solution, the interface forwarding delay information of the forwarding node further includes a deterministic delay forwarding capability of the interface of the forwarding node, and the deterministic delay forwarding capability of the interface of the forwarding node is a capability indicating whether the interface of the forwarding node can support completion of packet forwarding within a fixed delay range when performing packet forwarding; the device forwarding delay information of the forwarding node further includes a deterministic delay forwarding capability of the forwarding node, and the deterministic delay forwarding capability of the forwarding node is a capability indicating whether the forwarding node can support completion of packet forwarding in an internal processing stage of the data packet and within a fixed delay range, where the internal processing stage of the data packet includes the internal processing performed after the data packet enters the forwarding node from the inbound interface and before the data packet reaches the outbound interface, and the inbound interface and the outbound interface are the interfaces of the forwarding node; and correspondingly an interface of a node in the forwarding path supports the deterministic delay forwarding capability, and the node in the forwarding path supports the deterministic delay forwarding capability. In this way, when performing path computation, the network device may first determine whether the forwarding node has the deterministic delay forwarding capability, and perform path computation in a forwarding node that has the deterministic delay forwarding capability.

In a possible implementation solution, the notification packet further includes resource information of the forwarding node that sends the notification packet, and correspondingly, resource information of each node in the forwarding path meets a requirement of the service. In other words, each node in the forwarding path can provide a resource that meets the delay requirement of the service. The network device may compute the forwarding path in a forwarding node whose resource information can support specific delay guarantee.

In a possible implementation solution, that the delay of the forwarding path meets the delay requirement of the service includes a sum of an interface forwarding delay and a node forwarding delay of each node in the forwarding path and a transmission delay of a link in the forwarding path meets the delay requirement of the service.

In a possible implementation solution, the network device is a controller in a control and forwarding separation network architecture, or the network device is a path computation element (PCE), or the network device is a first node for user service access in the network.

In a possible implementation solution, the notification packet is an extended open shortest path first (OSPF) protocol packet, or an extended intermediate system-to-intermediate system (IS-IS) protocol packet, or an extended Border Gateway Protocol (BGP) packet. Network layout can be simplified by extending an existing protocol packet, and implementation is simpler.

In a possible implementation solution, the network device establishes the forwarding path between the first forwarding node and the second forwarding node based on information about the computed forwarding path, and sends a resource reservation request message to each node in the forwarding path, to ensure that the delay requirement of the service is met when the service is forwarded along the forwarding path.

In a possible implementation solution, the network device may be a head node device in the network. The head node device is used to collect the notification packet and compute the forwarding path, and an extra control device may not be needed. In this way, a network structure can be simplified, and maintenance and management can be facilitated.

According to a second aspect, an embodiment of this application further provides a method for computing a forwarding path, and the method includes generating, by a forwarding node, a notification packet, where the notification packet includes interface forwarding delay information of the forwarding node, device forwarding delay information of the forwarding node, and a transmission delay of a link connected to the forwarding node; and sending, by the forwarding node, the notification packet to a network device, to trigger the network device to store the interface forwarding delay information and the device forwarding delay information of the forwarding node and the transmission delay of the link connected to the forwarding node, and trigger the network device to compute a forwarding path between a first forwarding node and a second forwarding node based on stored interface forwarding delay information and stored device forwarding delay information of a plurality of forwarding nodes and a stored transmission delay of a link between the forwarding nodes, where the first forwarding node and the second forwarding node are nodes in the plurality of forwarding nodes, and a forwarding delay of the forwarding path meets a delay requirement of a service.

In a possible implementation solution, the interface forwarding delay information of the forwarding node includes a forwarding delay range of an interface of the forwarding node; and the device forwarding delay information of the forwarding node includes a forwarding delay range of the forwarding node, the forwarding delay range of the forwarding node is a delay range that can be ensured by internal processing performed after a data packet enters the forwarding node from an inbound interface and before the data packet reaches an outbound interface, and the inbound interface and the outbound interface are interfaces of the forwarding node.

In a possible implementation solution, the interface forwarding delay information of the forwarding node further includes a deterministic delay forwarding capability of the interface of the forwarding node, and the deterministic delay forwarding capability of the interface of the forwarding node is a capability indicating whether the interface of the forwarding node can support completion of packet forwarding within a fixed delay range when performing packet forwarding; the device forwarding delay information of the forwarding node further includes a deterministic delay forwarding capability of the forwarding node, and the deterministic delay forwarding capability of the forwarding node is a capability indicating whether the forwarding node can support completion of packet forwarding in an internal processing stage of the data packet and within a fixed delay range, where the internal processing stage of the data packet includes the internal processing performed after the data packet enters the forwarding node from the inbound interface and before the data packet reaches the outbound interface, and the inbound interface and the outbound interface are the interfaces of the forwarding node; and correspondingly an interface of a node in the forwarding path supports the deterministic delay forwarding capability, and the node in the forwarding path supports the deterministic delay forwarding capability.

According to a third aspect, an embodiment of this application further provides a network device for computing a forwarding path, and the network device includes a receiving unit configured to receive notification packets separately sent by a plurality of forwarding nodes, where each notification packet includes interface forwarding delay information of the forwarding node that sends the notification packet, device forwarding delay information of the forwarding node that sends the notification packet, and a transmission delay of a link connected to the forwarding node that sends the notification packet; an obtaining unit configured to obtain the interface forwarding delay information and the device forwarding delay information of each of the plurality of forwarding nodes based on the notification packet, and obtain a transmission delay of a link between the plurality of forwarding nodes based on the notification packet; and a processing unit configured to compute a forwarding path between a first forwarding node and a second forwarding node based on the interface forwarding delay information and the device forwarding delay information of each forwarding node and the transmission delay of the link between the plurality of forwarding nodes, where the first forwarding node and the second forwarding node are nodes in the plurality of forwarding nodes, and a forwarding delay of the forwarding path meets a delay requirement of a service.

According to a fourth aspect, an embodiment of this application further provides a forwarding node for computing a forwarding path, and the forwarding node includes a processing unit configured to generate a notification packet, where the notification packet includes interface forwarding delay information of the forwarding node, device forwarding delay information of the forwarding node, and a transmission delay of a link connected to the forwarding node; and a sending unit configured to send the notification packet to a network device, to trigger the network device to store the interface forwarding delay information and the device forwarding delay information of the forwarding node and the transmission delay of the link connected to the forwarding node, and trigger the network device to compute a forwarding path between a first forwarding node and a second forwarding node based on stored interface forwarding delay information and stored device forwarding delay information of a plurality of forwarding nodes and a stored transmission delay of a link between the forwarding nodes, where the first forwarding node and the second forwarding node are nodes in the plurality of forwarding nodes, and a forwarding delay of the forwarding path meets a delay requirement of a service.

According to a fifth aspect, an embodiment of this application further provides a network device for computing a forwarding path. The network device may include a processor, a memory, and a communications unit. The memory may be configured to store program code and data of the network device. The processor is configured to invoke a program instruction in the memory to perform the method described in the embodiment of the first aspect.

According to a sixth aspect, an embodiment of this application provides a forwarding node for computing a forwarding path. The forwarding node may include a processor, a memory, and a communications unit. The memory may be configured to store program code and data of the forwarding node. The processor is configured to invoke a program instruction in the memory to perform the method described in the embodiment of the second aspect.

According to the technical solutions provided in the embodiments of the present disclosure, the forwarding node in the network actively reports the interface forwarding delay information and the device forwarding delay information of the forwarding node and the transmission delay of the link between the forwarding nodes, and then the network device establishes, based on the delay information, the forwarding path that meets the delay requirement of the service, and forwards a service packet by using the path. In this way, a deterministic low transmission delay can be provided for service packet forwarding, and service packet transmission reliability can be ensured.

BRIEF DESCRIPTION OF DRAWINGS

To describe the technical solutions in the embodiments of this application more clearly, the following briefly describes the accompanying drawings required for describing the embodiments. The accompanying drawings in the following description show merely some embodiments of this application, and persons of ordinary skill in the art may still derive other drawings from these accompanying drawings without creative efforts.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. The described embodiments are merely a part rather than all of the embodiments of this application. All other embodiments obtained by persons of ordinary skill in the art based on the embodiments of this application without creative efforts shall fall within the protection scope of this application.

Figure 1:
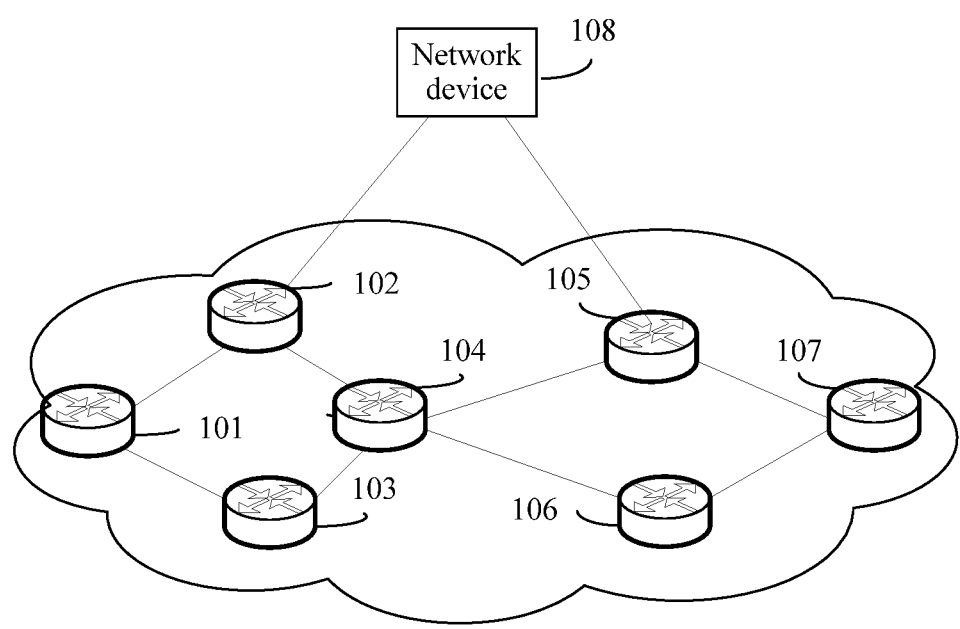
FIG. 1 is a schematic diagram of an application scenario of a method for computing a forwarding path according to an embodiment of this application.

Referring to FIG. 1, FIG. 1 is a schematic diagram of an application scenario in a network according to an embodiment of this application. The network includes a network device 108, a forwarding node 101, a forwarding node 102, a forwarding node 103, a forwarding node 104, a forwarding node 105, a forwarding node 106, and a forwarding node 107. The network device 108 may be a controller in a control and forwarding separation architecture and controls and manages the forwarding node 101 to the forwarding node 107. The network device 108 may also be a PCE. The forwarding node 101 is a first node when a user service packet enters the network, and may also be referred to as a head node. The head node is usually determined by an access location of a user service. The network device 108 may compute, in the network based on a service requirement, path information required for service forwarding and establish a forwarding path. Alternatively, the forwarding node 101 may compute, based on a service requirement, path information required for service forwarding and establish a forwarding path.

Figure 2:
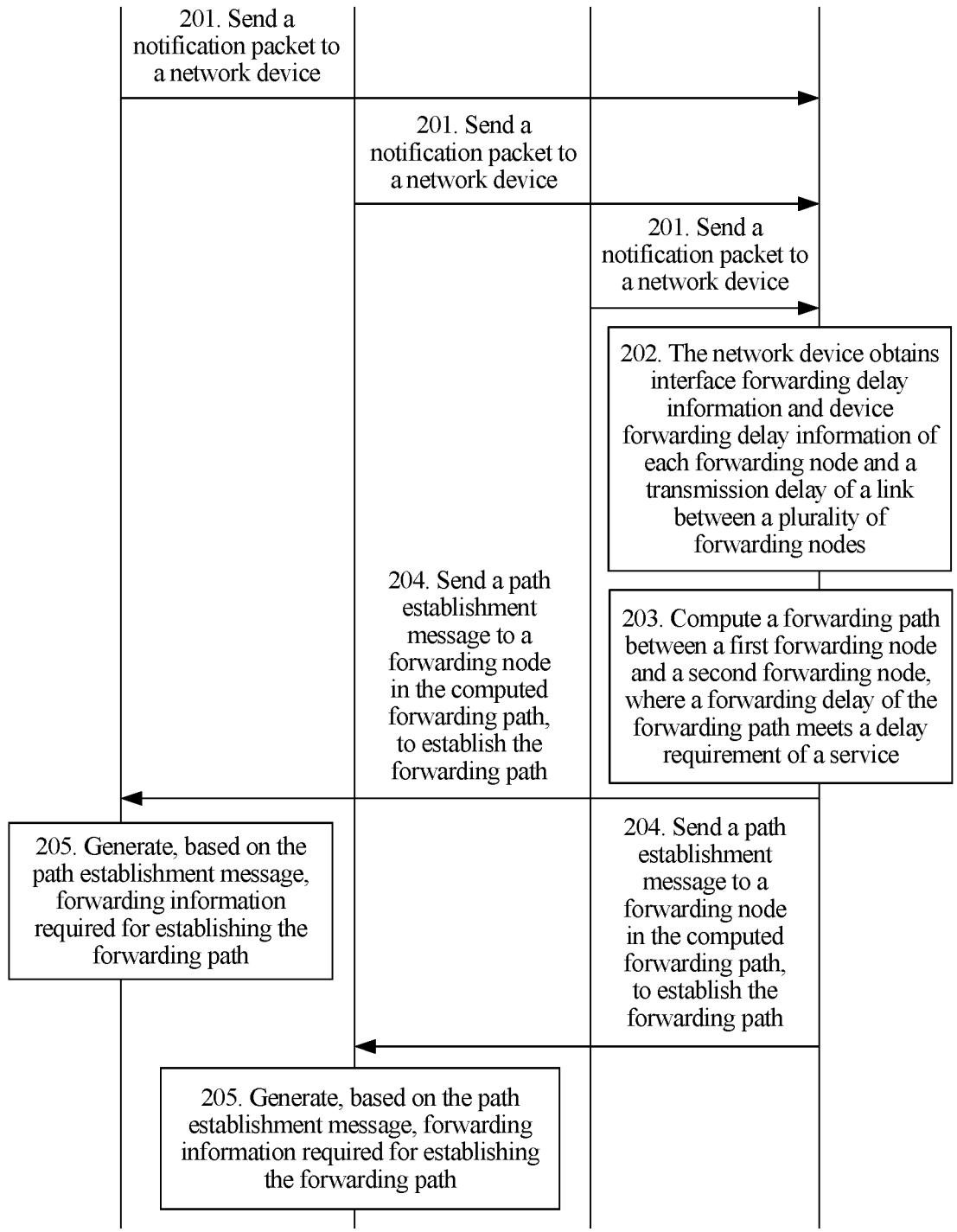
FIG. 2 is a schematic flowchart of a method for computing a forwarding path according to an embodiment of this application.

Referring to FIG. 2, with reference to the application scenario shown in FIG. 1, an embodiment of this application provides a method for computing a forwarding path. The method includes the following steps.

201. Each of a plurality of forwarding nodes in a network sends a notification packet to a network device. The notification packet includes interface forwarding delay information of the forwarding node that sends the notification packet, device forwarding delay information of the forwarding node that sends the notification packet, and a transmission delay of a link connected to the forwarding node that sends the notification packet.

The network device may be the network device 108 in FIG. 1, and the plurality of forwarding nodes may be forwarding nodes in the forwarding node 101 to the forwarding node 107 in FIG. 1.

202. The network device obtains the interface forwarding delay information and the device forwarding delay information of each of the plurality of forwarding nodes based on the notification packet, and obtains a transmission delay of a link between the plurality of forwarding nodes based on the notification packet.

Optionally, the interface forwarding delay information of the forwarding node includes a forwarding delay range of an interface of the forwarding node. The device forwarding delay information of the forwarding node includes a forwarding delay range of the forwarding node. The forwarding delay range of the forwarding node is a delay range that can be ensured by internal processing performed after a data packet enters the forwarding node from an inbound interface and before the data packet reaches an outbound interface. The inbound interface and the outbound interface are interfaces of the forwarding node.

The forwarding delay range of the interface of the forwarding node is a delay range when the data packet passes through the interface. For example, the forwarding delay range of the interface is 1 microsecond (us) to 10 us. An internal processing stage of the data packet includes the internal processing performed after the data packet enters the forwarding node from the inbound interface and before the data packet reaches the outbound interface. The inbound interface and the outbound interface are the interfaces of the forwarding node. For example, the forwarding delay range of the forwarding node is 5 us to 20 us.

Optionally, the interface forwarding delay information of the forwarding node further includes a deterministic delay forwarding capability of the interface of the forwarding node, and the deterministic delay forwarding capability of the interface of the forwarding node is a capability indicating whether the interface of the forwarding node can support completion of packet forwarding within a fixed delay range when performing packet forwarding.

The device forwarding delay information of the forwarding node further includes a deterministic delay forwarding capability of the forwarding node, and the deterministic delay forwarding capability of the forwarding node is a capability indicating whether the forwarding node can support completion of packet forwarding in the internal processing stage of the data packet and within a fixed delay range, where the internal processing stage of the data packet includes the internal processing performed after the data packet enters the forwarding node from the inbound interface and before the data packet reaches the outbound interface, and the inbound interface and the outbound interface are the interfaces of the forwarding node.

Correspondingly, an interface of a node in a forwarding path supports the deterministic delay forwarding capability, and the node in the forwarding path supports the deterministic delay forwarding capability.

Optionally, when computing the forwarding path, the network device may preferentially select a forwarding node that supports the deterministic delay forwarding capability, so as to establish the forwarding path, and an interface of the selected forwarding node also needs to support the deterministic delay forwarding capability.

Optionally, the network device may be a head node in the network. The head node in the network receives the notification packets separately sent by the plurality of forwarding nodes to the head node, and the head node computes the forwarding path.

Optionally, the notification packet may be an extended OSPF protocol packet. For example, an OSPF router information (RI) link-state advertisement (LSA) is extended, and a new OSPF node deterministic delay TLV is defined to carry the forwarding delay range of the forwarding node. A minimum delay (min delay) and a maximum delay (max delay) are used to represent the forwarding delay range of the forwarding node. In addition, a new bit may be defined in an OSPF router informational capabilities TLV, to identify whether the forwarding node supports the deterministic delay forwarding capability, namely, to identify whether the forwarding node supports a delay forwarding capability in the fixed delay range.

In another optional extension manner, an OSPF TE LSA is extended, and a new local interface deterministic capability TLV is defined in a link TLV in the extended OSPF TE LSA, to describe the deterministic delay forwarding capability of the interface of the forwarding node and a delay range that can be ensured. A new OSPF node deterministic delay sub-TLV is defined in a node attribute TLV to carry a delay range that can be ensured by the forwarding node.

The transmission delay of the link between the forwarding nodes is determined by a length of the link and is usually a fixed value, and may be carried by using a unidirectional link delay sub-TLV in RFC 7471, or may be carried by using a unidirectional link delay sub-TLV in RFC 7810.

Optionally, the notification packet is an extended IS-IS protocol packet. An IS-IS router CAPABILITY TLV is extended, and a new IS-IS node deterministic delay sub-TLV is defined to carry the delay range that can be ensured by the forwarding node. A new IS-IS TE sub-TLV such as a local interface deterministic capability TLV is defined to carry the deterministic delay forwarding capability of the interface of the forwarding node and the delay range that can be ensured.

Optionally, the notification packet is an extended BGP packet. A BGP-LS attribute of a BGP-LS is extended, and a new node attribute TLV is defined to carry the delay range that can be ensured by the forwarding node. A BGP-LS attribute of the BGP-LS is extended, and a new link attribute TLV is defined to carry a delay range that can be ensured by the interface of the forwarding node.

203. The network device computes a forwarding path between a first forwarding node and a second forwarding node based on the interface forwarding delay information and the device forwarding delay information of each forwarding node and the transmission delay of the link between the plurality of forwarding nodes. The first forwarding node and the second forwarding node are nodes in the plurality of forwarding nodes, and a forwarding delay of the forwarding path meets a delay requirement of a service.

The first forwarding node is a first node when the service enters the network. Before performing path computation, the network device learns in advance a type of the service and a node used for entering the network managed by the network device.

For example, when the service is a video service or a voice service, when the network forwards the service packet, a specific delay requirement needs to be met. For example, an end-to-end delay needs to be between 20 us and 50 us. In this way, timely transmission of the video service or the voice service can be ensured, and user experience can be enhanced. In this case, a sum of a forwarding delay of an interface that is of each node in the forwarding path and that forwards the service packet, an internal forwarding delay of each node, and a transmission delay of a link in the forwarding path meets the delay requirement of the service. A minimum value and a maximum value of the sum of delays can meet a delay range required by the service.

After the network device computes the forwarding path between the first forwarding node and the second forwarding node, the method may further include the following steps 204 and 205, so as to complete establishment of the forwarding path.

204. The network device sends a path establishment message to each forwarding node in the computed forwarding path. The path establishment message includes information required for establishing the forwarding path.

205. After receiving the path establishment message, the forwarding node in the forwarding path generates forwarding information required for establishing the forwarding path, so as to complete establishment of the forwarding path.

For example, when the network device is a PCE or a controller, the network device sends a forwarding entry of each node to each forwarding node in the forwarding path, such as information about an incoming label, an outgoing label, or an outbound interface. After receiving the path establishment message, the forwarding node in the forwarding path generates a corresponding forwarding entry. When each node in the forwarding path generates the corresponding forwarding entry, establishment of the forwarding path is completed.

It can be learned from the foregoing descriptions that, in the method for computing a path provided in this embodiment of this application, the forwarding node in the network actively reports the interface forwarding delay information and the device forwarding delay information of the forwarding node and the transmission delay of the link between the forwarding nodes, and then the network device establishes, based on the delay information, the forwarding path that meets the delay requirement of the service. In this way, a deterministic low transmission delay is provided for service packet forwarding.

Figure 3:
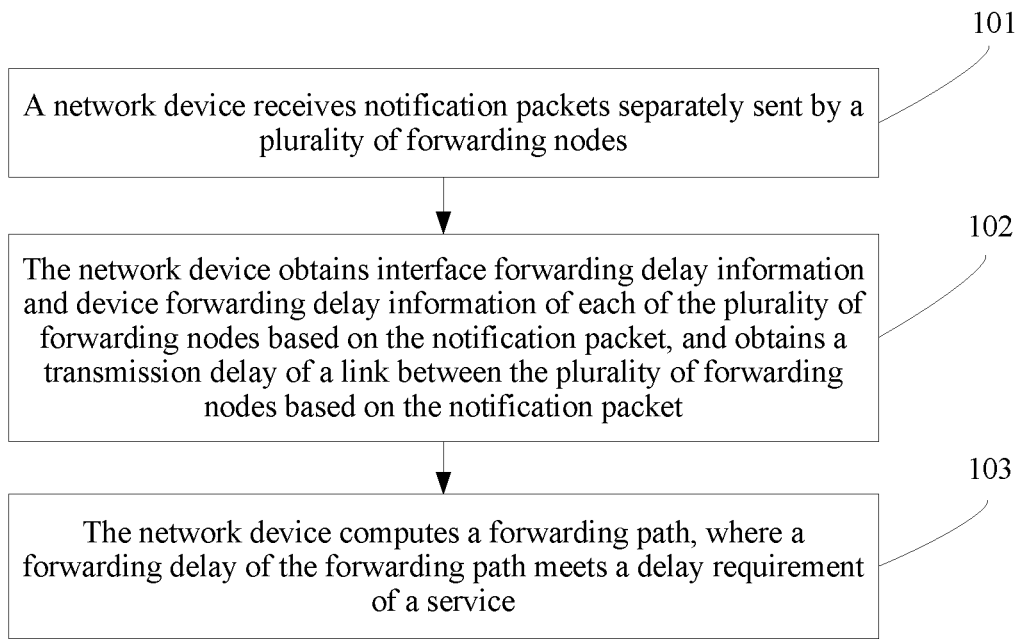
FIG. 3 is a schematic flowchart of another method for computing a forwarding path according to an embodiment of this application.

Referring to FIG. 3, with reference to the application scenario shown in FIG. 1, an embodiment of this application provides a method for computing a forwarding path. A network device in FIG. 3 may be the network device in the embodiment shown in FIG. 2. The method includes the following steps.

301. The network device receives notification packets separately sent by a plurality of forwarding nodes. Each notification packet includes interface forwarding delay information of the forwarding node that sends the notification packet, device forwarding delay information of the forwarding node that sends the notification packet, and a transmission delay of a link connected to the forwarding node that sends the notification packet.

The network device may be a controller in a control and forwarding separation network architecture, or the network device is a PCE, or the network device is a first node for user service access in the network.

302. The network device obtains the interface forwarding delay information and the device forwarding delay information of each of the plurality of forwarding nodes based on the notification packet, and obtains a transmission delay of a link between the plurality of forwarding nodes based on the notification packet.

303. The network device computes a forwarding path between a first forwarding node and a second forwarding node based on the interface forwarding delay information and the device forwarding delay information of each forwarding node and the transmission delay of the link between the plurality of forwarding nodes. The first forwarding node and the second forwarding node are nodes in the plurality of forwarding nodes, and a forwarding delay of the forwarding path meets a delay requirement of a service.

The notification packet is an extended OSPF protocol packet or an extended IS-IS protocol packet or an extended BGP packet. For specific content, refer to the embodiment shown in FIG. 2. Details are not described herein again.

Optionally, the notification packet further includes resource information of the forwarding node that sends the notification packet. The resource information is used to support deterministic delay forwarding, and the resource information may include a bandwidth, a cache, a queue, a timeslot, or the like. When computing a path, the network device needs to consider whether a resource of each forwarding node can support forwarding of a service packet. For example, if the service needs to occupy a 10 M bandwidth, the network device chooses to establish the path in a forwarding node whose resource can support a 10 M bandwidth. For another example, to enable the forwarding node to support specific delay forwarding, a specific cache or a specific queue needs to be reserved in advance on the forwarding node. The network device chooses to compute the forwarding path in a forwarding node whose resource information can ensure the delay requirement of the service.

Optionally, that the delay of the forwarding path meets the delay requirement of the service includes a sum of an interface forwarding delay and a node forwarding delay of each forwarding node in the forwarding path and a transmission delay of a link in the forwarding path meets the delay requirement of the service. It may be understood that an interface of each forwarding node in the forwarding path means that the interface is on the forwarding node and the interface is in the forwarding path.

Optionally, the network device establishes the forwarding path between the first forwarding node and the second forwarding node based on information about the computed forwarding path, and sends a resource reservation request message to each node in the forwarding path, to ensure that each forwarding node can provide specific delay guarantee and ensure that the service packet can be successfully forwarded.

It can be learned from the foregoing descriptions that, in the method for computing a path provided in this embodiment of this application, the network device receives the interface forwarding delay information and the device forwarding delay information of the forwarding node and the transmission delay of the link between the forwarding nodes that are sent by the forwarding node; computes, based on the delay information, the forwarding path that meets the delay requirement of the service; and forwards the service packet by using the path. In this way, a deterministic low transmission delay can be provided for service packet forwarding, and service packet transmission reliability can be ensured.

Figure 4:
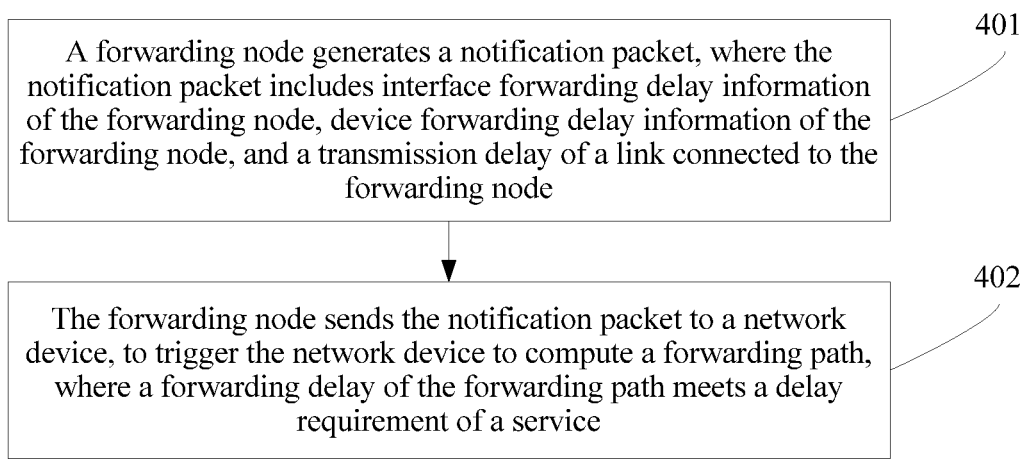
FIG. 4 is a schematic flowchart of another method for computing a forwarding path according to an embodiment of this application.

Referring to FIG. 4, with reference to the application scenario shown in FIG. 1, an embodiment of this application provides a method for computing a forwarding path. A network device in FIG. 4 may be the network device in the embodiment shown in FIG. 2, and a forwarding node in FIG. 4 may be the forwarding node in the embodiment shown in FIG. 2. The method includes the following steps.

401. The forwarding node generates a notification packet. The notification packet includes interface forwarding delay information of the forwarding node, device forwarding delay information of the forwarding node, and a transmission delay of a link connected to the forwarding node.

402. The forwarding node sends the notification packet to the network device, to trigger the network device to store the interface forwarding delay information and the device forwarding delay information of the forwarding node and the transmission delay of the link connected to the forwarding node, and trigger the network device to compute a forwarding path between a first forwarding node and a second forwarding node based on stored interface forwarding delay information and stored device forwarding delay information of a plurality of forwarding nodes and a stored transmission delay of a link between the forwarding nodes. The first forwarding node and the second forwarding node are nodes in the plurality of forwarding nodes, and a forwarding delay of the forwarding path meets a delay requirement of a service.

Optionally, the interface forwarding delay information of the forwarding node includes a forwarding delay range of an interface of the forwarding node.

The device forwarding delay information of the forwarding node includes a forwarding delay range of the forwarding node. The forwarding delay range of the forwarding node is a delay range that can be ensured by internal processing performed after a data packet enters the forwarding node from an inbound interface and before the data packet reaches an outbound interface. The inbound interface and the outbound interface are interfaces of the forwarding node.

Optionally, the interface forwarding delay information of the forwarding node further includes a deterministic delay forwarding capability of the interface of the forwarding node, and the deterministic delay forwarding capability of the interface of the forwarding node is a capability indicating whether the interface of the forwarding node can support completion of packet forwarding within a fixed delay range when performing packet forwarding.

The device forwarding delay information of the forwarding node further includes a deterministic delay forwarding capability of the forwarding node, and the deterministic delay forwarding capability of the forwarding node is a capability indicating whether the forwarding node can support completion of packet forwarding in an internal processing stage of the data packet and within a fixed delay range, where the internal processing stage of the data packet includes the internal processing performed after the data packet enters the forwarding node from the inbound interface and before the data packet reaches the outbound interface, and the inbound interface and the outbound interface are the interfaces of the forwarding node.

Correspondingly, an interface of a node in the forwarding path supports the deterministic delay forwarding capability, and the node in the forwarding path supports the deterministic delay forwarding capability.

It can be learned from the foregoing descriptions that, in the method for computing a path provided in this embodiment of this application, the forwarding node notifies the network device of the interface forwarding delay information and the device forwarding delay information of the forwarding node and the transmission delay of the link between the forwarding nodes, and the network device computes, based on the delay information, the forwarding path that meets the delay requirement of the service, and forwards a service packet by using the path. In this way, a deterministic low transmission delay can be provided for service packet forwarding, and service packet transmission reliability can be ensured.

Figure 5:
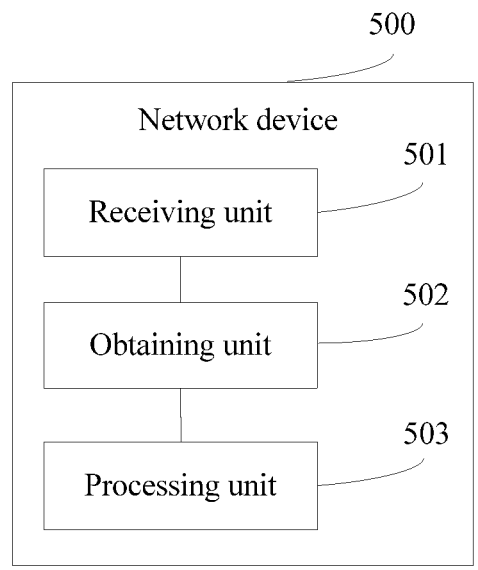
FIG. 5 is a schematic structural diagram of a network device according to an embodiment of this application.

Referring to FIG. 5, with reference to the application scenario shown in FIG. 1, an embodiment of this application provides a network device 500 for computing a forwarding path. The network device 500 in FIG. 5 may be the network device in the embodiment shown in FIG. 2. The network device 500 may perform the method in the embodiment shown in FIG. 2 or FIG. 3, and the network device 500 includes a receiving unit 501 configured to receive notification packets separately sent by a plurality of forwarding nodes, where each notification packet includes interface forwarding delay information of the forwarding node that sends the notification packet, device forwarding delay information of the forwarding node that sends the notification packet, and a transmission delay of a link connected to the forwarding node that sends the notification packet; an obtaining unit 502 configured to obtain the interface forwarding delay information and the device forwarding delay information of each of the plurality of forwarding nodes based on the notification packet, and obtain a transmission delay of a link between the plurality of forwarding nodes based on the notification packet; and a processing unit 503 configured to compute a forwarding path between a first forwarding node and a second forwarding node based on the interface forwarding delay information and the device forwarding delay information of each forwarding node and the transmission delay of the link between the plurality of forwarding nodes, where the first forwarding node and the second forwarding node are nodes in the plurality of forwarding nodes, and a forwarding delay of the forwarding path meets a delay requirement of a service.

Optionally, the interface forwarding delay information of the forwarding node includes a forwarding delay range of an interface of the forwarding node.

The device forwarding delay information of the forwarding node includes a forwarding delay range of the forwarding node. The forwarding delay range of the forwarding node is a delay range that can be ensured by internal processing performed after a data packet enters the forwarding node from an inbound interface and before the data packet reaches an outbound interface. The inbound interface and the outbound interface are interfaces of the forwarding node.

Optionally, the interface forwarding delay information of the forwarding node further includes a deterministic delay forwarding capability of the interface of the forwarding node, and the deterministic delay forwarding capability of the interface of the forwarding node is a capability indicating whether the interface of the forwarding node can support completion of packet forwarding within a fixed delay range when performing packet forwarding.

The device forwarding delay information of the forwarding node further includes a deterministic delay forwarding capability of the forwarding node, and the deterministic delay forwarding capability of the forwarding node is a capability indicating whether the forwarding node can support completion of packet forwarding in an internal processing stage of the data packet and within a fixed delay range, where the internal processing stage of the data packet includes the internal processing performed after the data packet enters the forwarding node from the inbound interface and before the data packet reaches the outbound interface, and the inbound interface and the outbound interface are the interfaces of the forwarding node.

Correspondingly, an interface of a node in the forwarding path supports the deterministic delay forwarding capability, and the node in the forwarding path supports the deterministic delay forwarding capability.

It can be learned from the foregoing descriptions that, the network device 500 provided in this embodiment of this application receives the interface forwarding delay information and the device forwarding delay information of the forwarding node and the transmission delay of the link between the forwarding nodes that are sent by the forwarding node; computes, based on the delay information, the forwarding path that meets the delay requirement of the service; and forwards a service packet by using the path. In this way, a deterministic low transmission delay can be provided for service packet forwarding, and service packet transmission reliability can be ensured.

Figure 6:
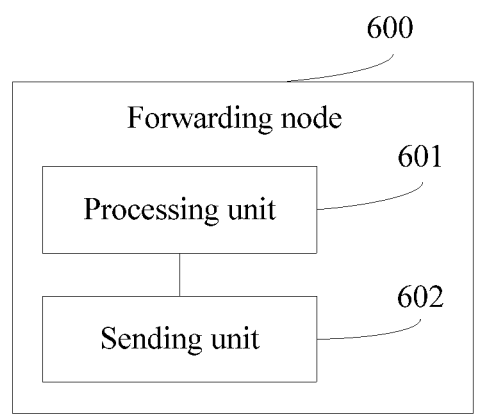
FIG. 6 is a schematic structural diagram of a forwarding node according to an embodiment of this application.

Referring to FIG. 6, with reference to the application scenario shown in FIG. 1, an embodiment of this application provides a forwarding node 600 for computing a forwarding path. The forwarding node 600 in FIG. 6 may be the forwarding node in the embodiment shown in FIG. 2. The forwarding node 600 may perform the method in the embodiment shown in FIG. 2 or FIG. 4, and the forwarding node 600 includes a processing unit 601 configured to generate a notification packet, where the notification packet includes interface forwarding delay information of the forwarding node, device forwarding delay information of the forwarding node, and a transmission delay of a link connected to the forwarding node; and a sending unit 602 configured to send the notification packet to a network device, to trigger the network device to store the interface forwarding delay information and the device forwarding delay information of the forwarding node and the transmission delay of the link connected to the forwarding node, and trigger the network device to compute a forwarding path between a first forwarding node and a second forwarding node based on stored interface forwarding delay information and stored device forwarding delay information of a plurality of forwarding nodes and a stored transmission delay of a link between the forwarding nodes, where the first forwarding node and the second forwarding node are nodes in the plurality of forwarding nodes, and a forwarding delay of the forwarding path meets a delay requirement of a service.

Optionally, the interface forwarding delay information of the forwarding node includes a forwarding delay range of an interface of the forwarding node.

The device forwarding delay information of the forwarding node includes a forwarding delay range of the forwarding node. The forwarding delay range of the forwarding node is a delay range that can be ensured by internal processing performed after a data packet enters the forwarding node from an inbound interface and before the data packet reaches an outbound interface. The inbound interface and the outbound interface are interfaces of the forwarding node.

Optionally, the interface forwarding delay information of the forwarding node further includes a deterministic delay forwarding capability of the interface of the forwarding node, and the deterministic delay forwarding capability of the interface of the forwarding node is a capability indicating whether the interface of the forwarding node can support completion of packet forwarding within a fixed delay range when performing packet forwarding.

The device forwarding delay information of the forwarding node further includes a deterministic delay forwarding capability of the forwarding node, and the deterministic delay forwarding capability of the forwarding node is a capability indicating whether the forwarding node can support completion of packet forwarding in an internal processing stage of the data packet and within a fixed delay range, where the internal processing stage of the data packet includes the internal processing performed after the data packet enters the forwarding node from the inbound interface and before the data packet reaches the outbound interface, and the inbound interface and the outbound interface are the interfaces of the forwarding node.

Correspondingly, an interface of a node in the forwarding path supports the deterministic delay forwarding capability, and the node in the forwarding path supports the deterministic delay forwarding capability.

It can be learned from the foregoing descriptions that, in the forwarding node for computing a path provided in this embodiment of this application, the forwarding node notifies the network device of the interface forwarding delay information and the device forwarding delay information of the forwarding node and the transmission delay of the link between the forwarding nodes, and the network device computes, based on the delay information, the forwarding path that meets the delay requirement of the service, and forwards a service packet by using the path. In this way, a deterministic low transmission delay can be provided for service packet forwarding, and service packet transmission reliability can be ensured.

Figure 7:
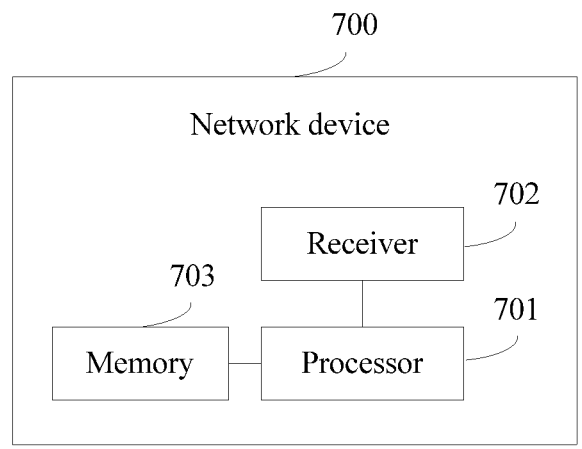
FIG. 7 is a schematic structural diagram of another network device according to an embodiment of this application.

Referring to FIG. 7, FIG. 7 is a schematic structural diagram of a network device for computing a path according to an embodiment of the present disclosure. A network device 700 provided in this embodiment may be applied to the method of the embodiment in FIG. 2 or FIG. 3, to implement a function of the network device. The network device 700 includes a processor 701, a receiver 702, and a memory 703. The processor 701 includes but is not limited to one or more of a CPU, a network processor (NP), an application-specific integrated circuit (ASIC), or a programmable logic device (PLD). The PLD may be a complex programmable logic device (CPLD), a field-programmable gate array (FPGA), generic array logic (GAL), or any combination thereof.

The memory 703 may include but is not limited to a content-addressable memory (CAM), such as a ternary content-addressable memory (TCAM) or a random access memory (RAM).

The receiver 702 may include a common physical interface, and the physical interface may be an Ethernet interface or an asynchronous transfer mode (ATM) interface. The processor 701, the receiver 702, and the memory 703 may be integrated into one or more independent circuits or hardware, for example, an ASIC.

The memory 703 may be configured to store program code and data of the network device 700. The processor 701 is configured to invoke a program instruction in the memory 703 to perform the method in the foregoing embodiment so as to compute a forwarding path. For specific steps of computing the path, refer to the foregoing embodiment. Details are not described herein again.

Figure 8:
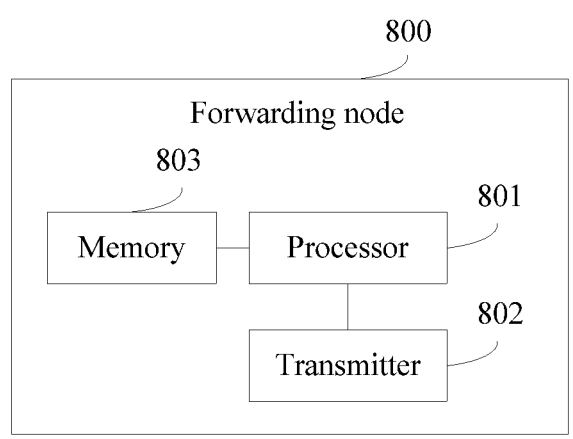
FIG. 8 is a schematic structural diagram of another forwarding node according to an embodiment of this application.

Referring to FIG. 8, FIG. 8 is a schematic structural diagram of a forwarding node for computing a path according to an embodiment of the present disclosure. A forwarding node 800 provided in this embodiment may be applied to the method of the embodiment in FIG. 2 or FIG. 4, to implement a function of the forwarding node. The forwarding node 800 includes a processor 801, a transmitter 802, and a memory 803. The processor 801 includes but is not limited to one or more of a CPU, an NP, an ASIC, or a PLD. The PLD may be a CPLD, an FPGA, GAL, or any combination thereof.

The memory 803 may include but is not limited to a CAM, such as a TCAM or a RAM.

The transmitter 802 may include a common physical interface, and the physical interface may be an Ethernet interface or an ATM interface. The processor 801, the transmitter 802, and the memory 803 may be integrated into one or more independent circuits or hardware, for example, an ASIC.

The memory 803 may be configured to store program code and data of the forwarding node 800. The processor 801 is configured to invoke a program instruction in the memory 803 to perform the method in the foregoing embodiment so as to compute a forwarding path. For specific steps of computing the path, refer to the foregoing embodiment. Details are not described herein again.

Persons of ordinary skill in the art may understand that all or a part of the steps of the method in the embodiments of the present disclosure may be implemented by a program instructing relevant hardware. The program may be stored in a computer readable storage medium. When the program runs, the steps of the method in the embodiments of the present disclosure are performed. The storage medium may be at least one of the following media, media that are capable of storing program code, such as a read-only memory (ROM), a RAM, a magnetic disk, or an optical disc.

Finally, it should be noted that the foregoing embodiments are merely intended for describing an example of the technical solutions of this application other than limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A method implemented by a network device, the method comprising:
   receiving notification packets from a plurality of forwarding nodes, wherein each of the notification packets comprises an interface forwarding delay of a forwarding node that sends the notification packet, a device forwarding delay of the forwarding node, and a transmission delay of a link connected to the forwarding node, wherein the device forwarding delay comprises a delay which begins after a data packet enters an input of the forwarding node and ends before the data packet arrives at an output of the forwarding node, and wherein the transmission delay includes a link delay of the forwarding node;
   obtaining, from each of the notification packets, the interface forwarding delay, the device forwarding delay, and the transmission delay; and
   computing a forwarding path between a first forwarding node and a second forwarding node based on the notification packets,
   wherein a forwarding delay of the forwarding path meets a requirement of a service.

2. The method of claim 1, wherein the interface forwarding delay comprises a queue delay range of the forwarding node.

3. The method of claim 1, wherein the interface forwarding delay comprises a deterministic delay forwarding capability of an interface of the forwarding node, and wherein the deterministic delay forwarding capability comprises a capability indicating whether the interface can support completion of packet forwarding within a fixed delay range.

4. The method of claim 3, further comprising sending a resource reservation request message to the forwarding nodes in the forwarding path to ensure that the requirement is met when the service is forwarded along the forwarding path.

5. The method of claim 1, wherein each of the notification packets further comprises resource information of the forwarding node.

6. The method of claim 1, wherein the forwarding delay meets the requirement when a minimum value and a maximum value of the forwarding delay meet a delay range required by the service.

7. The method of claim 1, wherein the network device is a path computation element (PCE) or an ingress node of a deterministic flow.

8. The method of claim 1, wherein each of the notification packets is an Open Shortest Path First (OSPF) packet or an Intermediate System to Intermediate System (IS-IS) packet.

9. The method of claim 1, wherein the forwarding nodes support a delay forwarding capability in a fixed delay range.

10. The method of claim 9, wherein each of the notification packets further comprises a flag indicating that the forwarding node supports a delay forwarding capability in the fixed delay range.

11. The method of claim 1, wherein the forwarding delay comprises a deterministic minimum delay and a deterministic maximum delay.

12. A method implemented by a forwarding node, the method comprising:
   generating a notification packet comprising an interface forwarding delay of the forwarding node, a device forwarding delay of the forwarding node, and a transmission delay of a link connected to the forwarding node, wherein the device forwarding delay comprises a delay which begins after a data packet enters an input of the forwarding node and ends before the data packet arrives at an output of the forwarding node, and wherein the transmission delay includes a link delay of the forwarding node; and
   sending the notification packet to a network device for computing a forwarding path between the forwarding node and another forwarding node,
   wherein a forwarding delay of the forwarding path meets a requirement of a service.

13. The method of claim 12, wherein the interface forwarding delay comprises a queue delay range of the forwarding node.

14. The method of claim 12, wherein the forwarding delay meets the requirement when a minimum value and a maximum value of the forwarding delay meet a delay range required by the service.

15. A network device comprising:
   a non-transitory computer-readable storage medium configured to store instructions; and
   a processor coupled to the non-transitory computer-readable storage medium and configured to execute the instructions to cause the network device to:
      receive notification packets from a plurality of forwarding nodes, wherein each of the notification packets comprises an interface forwarding delay of a forwarding node that sends the notification packet, a device forwarding delay of the forwarding node, and a transmission delay of a link connected to the forwarding node, wherein the device forwarding delay comprises a delay which begins after a data packet enters an input of the forwarding node and ends before the data packet arrives at an output of the forwarding node, and wherein the transmission delay includes a link delay of the forwarding node;
      obtain, from each of the notification packets, the interface forwarding delay, the device forwarding delay, and the transmission delay; and
      compute a forwarding path between a first forwarding node and a second forwarding node based on the notification packets,
      wherein a forwarding delay of the forwarding path meets a requirement of a service.

16. The network device of claim 15, wherein the forwarding delay meets the requirement when a minimum value and a maximum value of the forwarding delay meet a delay range required by the service.

17. The network device of claim 15, wherein the interface forwarding delay comprises a queue delay range of the forwarding node.

18. A forwarding node comprising:
   a non-transitory computer-readable storage medium configured to store instructions; and
   a processor coupled to the non-transitory computer-readable storage medium and configured to execute the instructions to cause the forwarding node to:

generate a notification packet comprising an interface forwarding delay of the forwarding node, a device forwarding delay of the forwarding node, and a transmission delay of a link connected to the forwarding node, wherein the device forwarding delay comprises a delay which begins after a data packet enters an input of the forwarding node and ends before the data packet arrives at an output of the forwarding node, and wherein the transmission delay includes link delay of the forwarding node; and send the notification packet to a network device for computing a forwarding path between the forwarding node and another forwarding node, and wherein a forwarding delay of the forwarding path meets a delay requirement of a service.

19. The forwarding node of claim 18, wherein the interface forwarding delay comprises a queue delay range of the forwarding node.

20. The forwarding node of claim 18, wherein the forwarding delay comprises a deterministic minimum delay and a deterministic maximum delay.

\* \* \* \* \*